US012639467B2

(12) United States Patent     (10) Patent No.:   US 12,639,467 B2

Noor et al.        (45) Date of Patent:     May 26, 2026

(54) SYSTEMS AND METHODS FOR ACCESS CONTROL POLICY MANAGEMENT

(71) Applicant: Netflix, Inc., Los Gatos, CA (US)

(72) Inventors: David Imran Noor, Kirkland, WA (US); Allen J Collins, San Jose, CA (US); Brandon Christopher Quan, Roanoke, TX (US)

(73) Assignee: Netflix, Inc., Los Gatos, CA (US)

( * ) Notice: Subject to any disclaimer, the term of this patent is extended or adjusted under 35 U.S.C. 154(b) by 0 days.

(21) Appl. No.: 18/910,560

(22) Filed: Oct. 9, 2024

(65) Prior Publication Data

US 2026/0099618 A1     Apr. 9, 2026

(51) Int. Cl.
*G06F 21/62*       (2013.01)

(52) U.S. Cl.
CPC ................................. *G06F 21/6218* (2013.01)

(58) Field of Classification Search
CPC .................................................... G06F 21/6218
See application file for complete search history.

(56) References Cited

U.S. PATENT DOCUMENTS

| | | | | |
|---|---|---|---|---|
| 12,282,585 B2 * | 4/2025 | Mehta | ................. | G06F 21/6245 |
| 2007/0180490 A1 * | 8/2007 | Renzi | .................... | G06F 21/604 |
| | | | | 726/1 |

| | | | |
|---|---|---|---|
| 2020/0074104 A1 | 3/2020 | Sommerville et al. | |
| 2021/0035116 A1 * | 2/2021 | Berrington | ............... G06N 5/04 |
| 2022/0069981 A1 | 3/2022 | Jog et al. | |
| 2024/0184907 A1 | 6/2024 | Morita et al. | |

FOREIGN PATENT DOCUMENTS

CN       110457405 A     11/2019

OTHER PUBLICATIONS

International Search Report and Written Opinion issued in PCT Application No. PCT/US2025/049603 dated Jan. 26, 2026.

* cited by examiner

*Primary Examiner* — Han Yang

(74) *Attorney, Agent, or Firm* — Hogan Lovells US LLP

(57) ABSTRACT

A computer-implemented method and system for managing access control policies for diverse database tables. The method involves consolidating access control by associating each table with a common set of access control policies, enforcing these policies to control access, and providing automated management without administrator input. The automated management includes auditing the policies, detecting discrepancies, and remedying them by modifying the policies. The system comprises at least one physical processor and memory containing instructions that, when executed, perform the method described.

20 Claims, 10 Drawing Sheets

Method
100

Start

Consolidate, by a computing device of a security management system, access control to a set of diverse database tables by associating each table in the set of diverse database tables with a set of common access control policies
110

Enforce, by the computing device of the security management system, the set of common access control policies to control access to each table in the set of database tables
120

Provide, by the computing device of the security management system and without administrator input, automated management of the set of common access control policies
130

End

Method
100

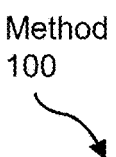

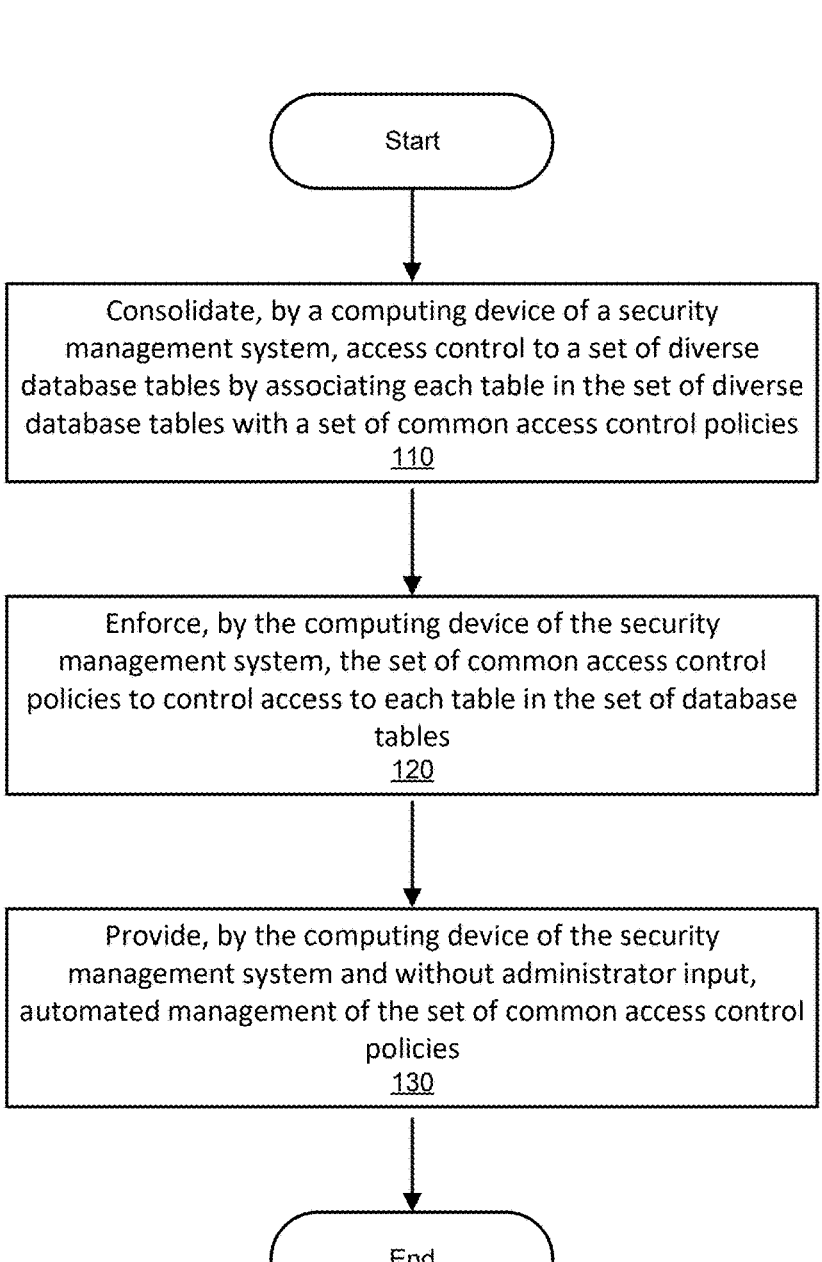

Start

Consolidate, by a computing device of a security
management system, access control to a set of diverse
database tables by associating each table in the set of diverse
database tables with a set of common access control policies
110

Enforce, by the computing device of the security
management system, the set of common access control
policies to control access to each table in the set of database
tables
120

Provide, by the computing device of the security
management system and without administrator input,
automated management of the set of common access control
policies
130

End

*FIG. 1*

Method
200
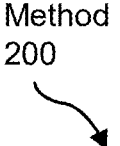
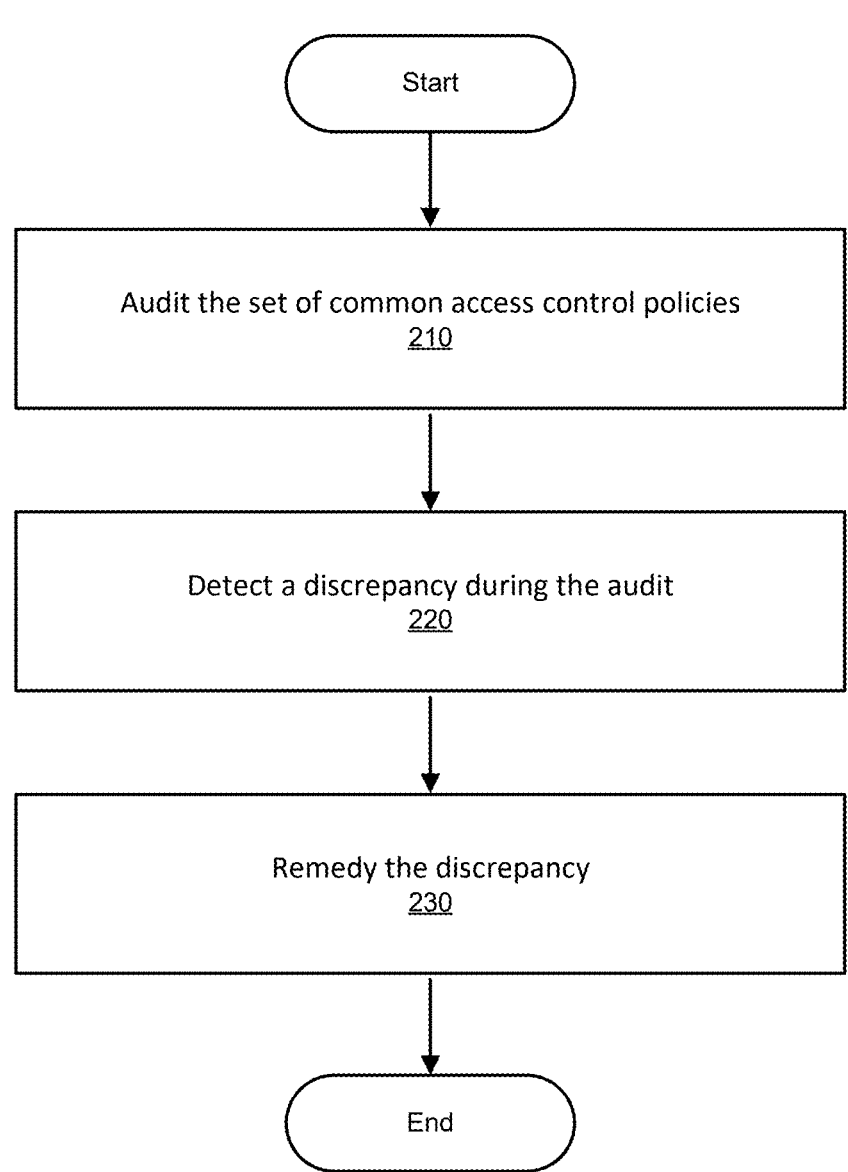
Start
Audit the set of common access control policies
210
Detect a discrepancy during the audit
220
Remedy the discrepancy
230
End
*FIG. 2*

700

430

Database

420 → Database Policies

1. Periodically Reconcile Each Lockbox

Security Management System

330

| Secure_tag |
| --- |
| Read_policy_id |
| Write_policy_id |
| Admin_policy_id |
| Tables |

320 → Set of Diverse Database Tables

520

Metadata Management System

2. API Call to Add Policies to all Tables that are Part of A Set

3. Table ACLs Updated

| ads_comedy |
| --- |
| Row 1 |
| Row 2 |
| Row 3 |

| ads_drama |
| --- |
| Row 1 |
| Row 2 |
| Row 3 |

800

SYSTEMS AND METHODS FOR ACCESS CONTROL POLICY MANAGEMENT

BACKGROUND

Many organizations manage vast amounts of sensitive data, and each organization has its own unique access control requirements. Traditional methods for managing access to this data often involve manual processes, which are prone to human errors. These methods also typically consume significant resources to be set up and maintained in a manner that provides adequate data protection and confidentiality.

SUMMARY

As will be described in greater detail below, the present disclosure describes systems and methods for automated management of access control policies. In some examples, a computer-implemented method for managing data security and privacy involves consolidating access control to a set of diverse database tables by associating each table with a common set of access control policies. These policies are enforced by a security management system to control access to each table. Additionally, the system provides automated management of these policies without requiring administrator input.

In certain examples, the method includes auditing of the access control policies, detecting discrepancies during the audit, and remedying these discrepancies by modifying the policies, all without administrator input. In some cases, detecting discrepancies involves identifying unauthorized access to the database tables. The method then remedies this by removing the unauthorized access from the access control policies. Additionally or alternatively, detecting discrepancies includes identifying when access control has been removed or modified. The system remedies this by restoring the original access control settings.

In some examples, the method for managing access control policies involves incorporating the management of encryption keys used to secure data stored in the database tables. Access to these keys are managed as part of the automated management of access control policies. In certain examples, the method includes the aggregation of contextual information about the database tables as part of the automated management. This contextual information helps inform and optimize the access control policies. In such examples, the method can also specify that the contextual information aggregated includes at least one of access frequency, data lineage, and criticality ranking. These types of information provide valuable insights into the usage and importance of the data tables.

Is some aspects, the techniques discussed herein involve a system having at least one physical processor and physical memory. The system is configured to perform the method described above, including consolidating access control, enforcing access control policies, and providing automated management without administrator input. In certain examples, the techniques discussed herein involve a non-transitory computer-readable medium containing instructions that, when executed by a processor, cause the computing device to perform the method described above, including consolidating access control, enforcing access control policies, and providing automated management without administrator input.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

FIG. 1 is a flow diagram of an exemplary method for managing data security and privacy using a security management system.

FIG. 2 is a flow diagram of an exemplary method for auditing access control policies and remedying discrepancies.

Figure 3:
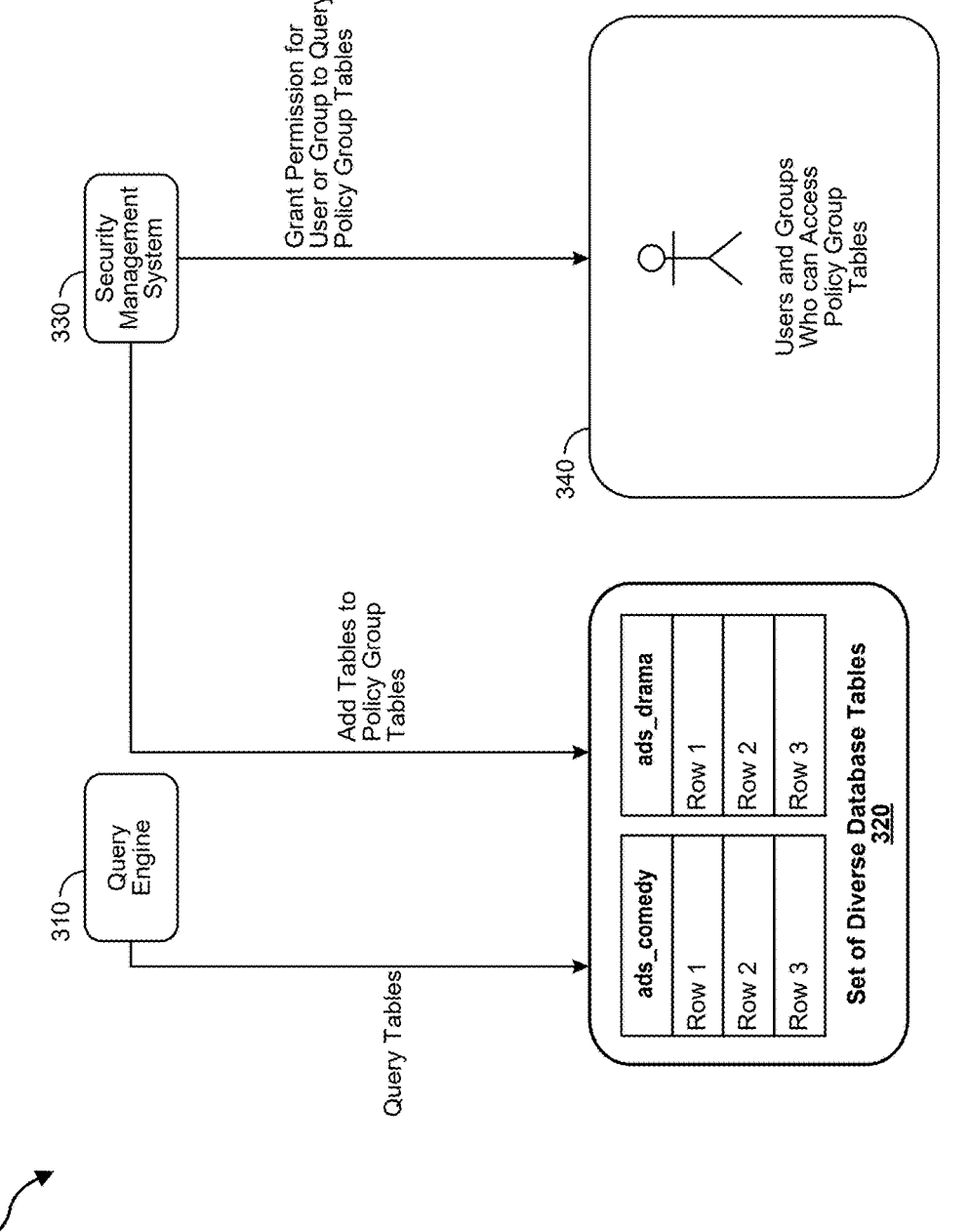
FIG. 3 illustrates an exemplary system for managing access to database tables that are grouped by access control policy.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

As noted above, organizations increasingly handle sensitive data that requires strong protection and confidentiality measures. Traditional procedures for managing access to such data involves careful oversight by administrators, which can be time-consuming and prone to errors. For example, changing access control as people move in, out, and within an organization often involves significant manual effort.

As an additional challenge, many organizations manage significant amounts of sensitive data across databases and datasets that store different types of information. These organizations often maintain access control policies at a dataset or database level, which results in maintaining multiple identical sets of control policies. Thus, this fragmented approach typically involves maintaining large numbers of data policies and, as a result, are difficult to maintain and prone to unauthorized accesses, data breaches, and compliance issues. Furthermore, documenting access grants and managing distinct sets of permissions for so many individual datasets can be cumbersome and opaque. This lack of transparency makes it difficult to track and manage who has access to what data and why.

As will be explained in greater detail below, the present disclosure is generally directed to automated management of access to diverse data tables by creating logical groupings of data tables that share a common set of access control policies but that do not need to be related to each other in any other way. In other words, instead of the traditional approach of applying control policies to groups of related data, the present disclosure groups data that has common access permissions and then applies and manages access control policies to these logical access-control groups. In this way, the systems and methods presented herein reduce the number of access permissions that need to be managed and facilitate more effective automation of various management tasks.

By consolidating access control for a diverse set of database tables under a common set of access control policies, the methods and systems described herein simplify the management of data access and control. The disclosed approaches establish consistent application of access rules across tables, regardless of their content or purpose, reducing the complexity and potential for errors associated with managing multiple, disparate access control systems. Furthermore, this increased simplicity enables improved automated management of access control policies. For example, the systems described herein perform auditing of access control policies to detect discrepancies and ensure compliance. This continuous monitoring helps identify and address potential security issues promptly, thereby maintaining the integrity of the access control system and ensuring that data remains protected. This type of automation ensures that access rules are applied accurately and consistently, reducing the likelihood of security breaches due to misconfigurations or oversight. As a result, organizations are able to more easily track who has access to what data and why, improving accountability and facilitating compliance with regulatory requirements. In this way, the management and auditing capabilities of embodiments described herein provide greater transparency into access control practices.

The ability of the disclosed systems to manage access control for a diverse set of database tables makes it highly scalable. Using this approach, organizations can apply security policies to new tables and databases without the need for significant reconfiguration, making the disclosed systems suitable for dynamic and growing data environments.

Figure 5:
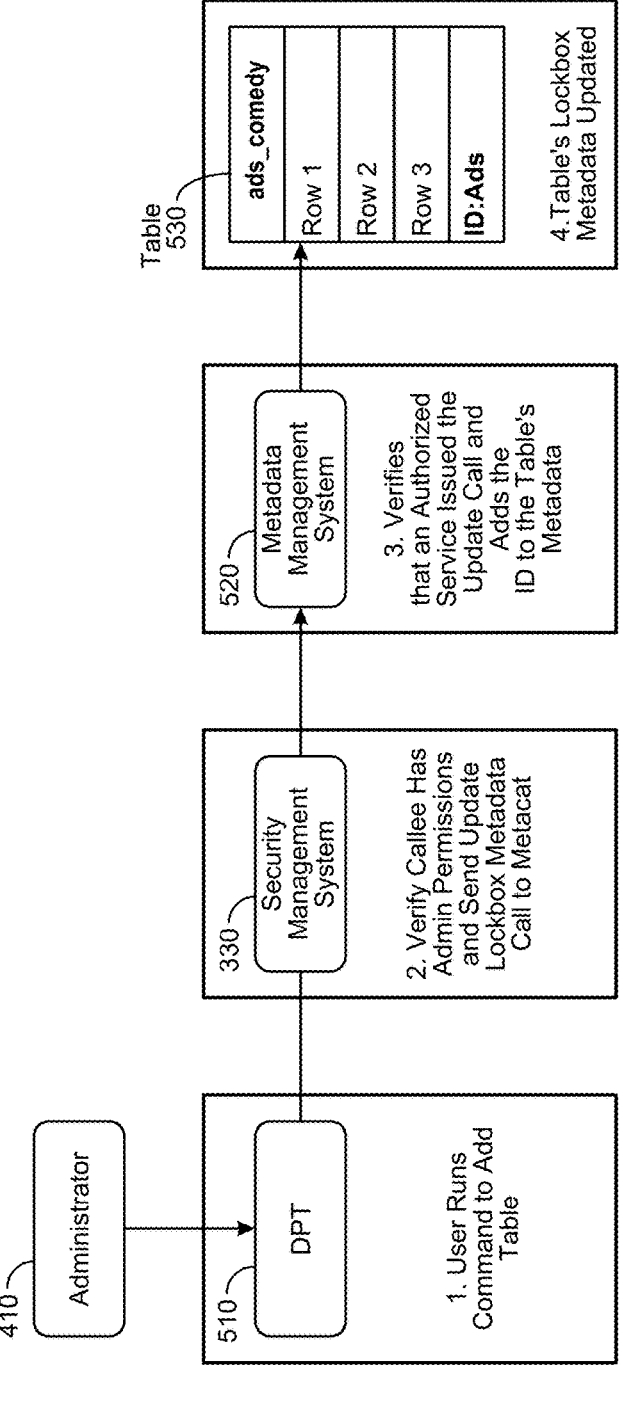
FIG. 5 illustrates an exemplary system for adding a table to a set of tables grouped by policy.
Figure 6:
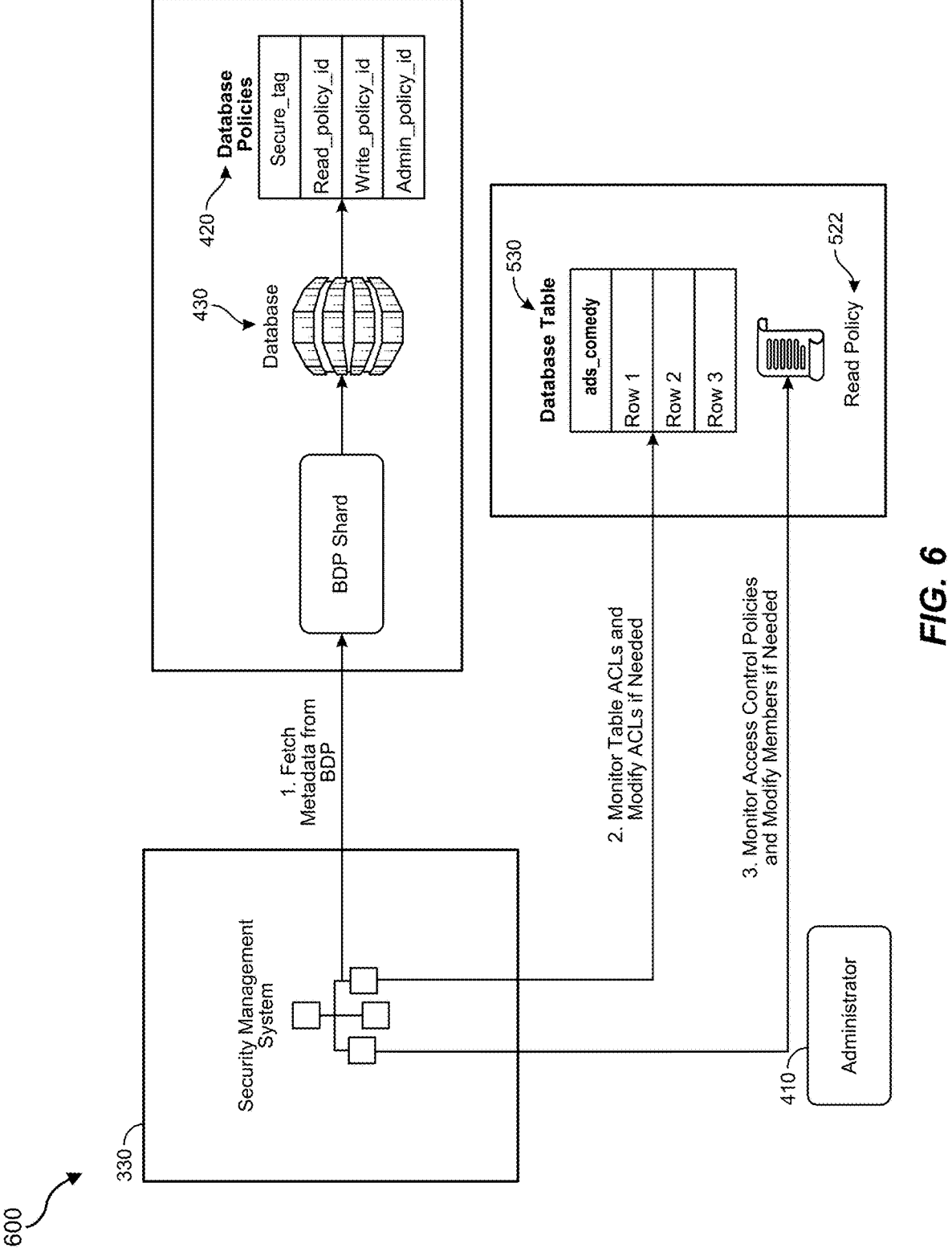
FIG. 6 illustrates an exemplary system for monitoring and rightsizing access to database tables within a set of tables grouped by policy.
Figure 7:
FIG. 7 illustrates an exemplary system for managing and reconciling access control policies for database tables grouped by policy.

The following will provide, with reference to FIGS. 1-10, detailed descriptions of a security management systems for managing access control policies using a set of tables grouped by policy. For example, exemplary methods for managing data security and privacy are discussed in connection with FIGS. 1 and 2, with FIG. 1 focused on providing security management and FIG. 2 focused on security auditing and remediation. The discussion of FIGS. 3 and 4 covers various examples of security management systems and policy implementation, and the discussion of FIGS. 5 and 6 covers security monitoring and various examples of maintaining and updating security systems. The disclosure corresponding to FIG. 7 provides additional detail on the reconciliation process, including the roles of the security management system, database, database policies, and metadata management system. The discussion of FIGS. 8-10 describes exemplary content distribution ecosystems in which embodiments of this disclosure are implemented, including a distribution infrastructure and a content player.

FIG. 1 is a flow diagram of an exemplary computer-implemented method 100 for access control policy management. The steps shown in FIG. 1 may be performed by any suitable computer-executable code and/or computing system, including the system(s) illustrated in FIGS. 3-10. In one example, each of the steps shown in FIG. 1 may represent an algorithm whose structure includes and/or is represented by multiple sub-steps, examples of which will be provided in greater detail below.

At step 110 of FIG. 1, a security management system consolidates access control to a set of diverse database tables by associating each table in the set with a common set of access control policies. In this step, the security management system identifies a set of diverse database tables that require unified access control. These tables may reside in different databases and may contain different types of data, but they are grouped together for the purpose of applying common access control policies.

A security management system performs the step of consolidating access control in any suitable manner by performing one or more of a variety of sub-steps. In some examples, the security management system defines a set of common access control policies that will be applied to all the identified tables. These policies include read, write, and admin permissions (or any other suitable set of permissions), specifying the actions that users and groups can perform on the data. Each table in the set is associated with the common access control policies. In various embodiments, the security management system implements this association by updating the metadata of each table to include references to the common policies. The security management system stores the metadata in a centralized database, such as a DynamoDB table, a Relational Database Service table, a MongoDB table, a Cassandra table a Cosmos DB table, etc. The security management system also uses tagging mechanisms to indicate that a table is part of the consolidated access control group. These tags are added to the table's metadata and are used to enforce the common access control policies.

As an example of consolidating access according to step 110, a company has multiple databases containing customer information, sales data, and product inventory. Each database has its own access control policies, making it difficult to manage permissions consistently. By consolidating access control, the company can define a common set of policies that apply to table regardless of the database they reside in.

As another example, an organization manages sensitive financial data across different departments, each with its own database. To ensure consistent access control, the organization consolidates access by defining common policies for all financial tables. These policies specify who can view, modify, and administer the financial data. By associating each financial table with these common policies, the organization ensures that access rules are uniformly applied, reducing the risk of unauthorized access and improving compliance with regulatory requirements.

As a third example, a research institution collects data from various experiments, stored in separate databases. Each experiment's data has different access requirements, making it challenging to manage permissions. By consolidating access control, the institution can create a common set of policies for all experimental data, specifying who can access, analyze, and publish the data. This unified approach simplifies access management and ensures that only authorized researchers can access sensitive experimental data.

As a fourth example, a content streaming platform manages sensitive information used in advertising, including customer viewing history, ad interaction data, and demographic information. These data sets are stored in different databases, each with its own access control policies, making it challenging to manage permissions consistently. By consolidating access control, the platform can define a common set of policies that apply to all advertising-related tables, regardless of the database they reside in. These common policies grant read and write permissions to the "Advertising Team" group and admin permissions to the "Data Administrators" group. By associating each advertising-related table with these common policies, the platform ensures that access rules are uniformly applied, reducing the risk of unauthorized access and improving compliance with regulatory requirements. This unified approach simplifies access management and ensures that only authorized users can access and modify sensitive advertising data, enhancing data security and operational efficiency.

As shown in these examples, at step 110 a security management system streamlines the management of access control by consolidating diverse database tables under a common set of policies, thereby enhancing security, consistency, and operational efficiency. The terms consolidating access control, security management system, diverse database tables, and common access control policies will now each be discussed in greater detail.

Consolidating access control refers to the process of unifying and standardizing access permissions across multiple data resources. Instead of managing access controls individually for each table, a system groups them under a single set of policies. This consolidation simplifies the management of permissions and ensures consistent application of access rules.

The term access control policy generally refers to a set of rules and permissions that govern who can access specific data resources and what actions they can perform on those resources. These policies are important for ensuring data security, privacy, and compliance with regulatory requirements. In the context of a policy system with tables grouped by policy, access control policies are used to manage permissions for diverse database tables in a unified and consistent manner. Components of access control policies include permissions that define the specific actions that users or groups can perform on the data. Common types of permissions include (1) read access, which allows users to view or retrieve data from the database tables, (2) write access, which allows users to modify data in the database tables, including inserting, updating, and deleting records, and (3) admin access, which grants users the ability to manage access control policies, including adding or removing users or groups and modifying permissions.

As noted, access control policies specify which users or groups are granted specific permissions. In some examples, users are individual accounts within an organization, while groups are collections of users that share the same access permissions. Group-based access control simplifies the management of permissions by allowing administrators to assign policies to groups rather than individual users. Roles are predefined sets of permissions that can be assigned to users or groups. For example, a "Data Analyst" role might include read and write permissions, while an "Administrator" role might include read, write, and admin permissions. Roles help standardize access control and simplify the assignment of permissions.

Conditions are additional criteria that must be met for access to be granted. These can include time-based restrictions (e.g., access only during business hours), location-based restrictions (e.g., access only from specific IP addresses), or other contextual factors. Conditions add an extra layer of security by ensuring that access is granted only under specific circumstances.

Consolidation of access control is performed by a security management system, and in some examples, the term security management system generally refers to a system that manages data security and privacy. It includes the computing devices, software applications, and processes that ensure data is protected, access is controlled, and compliance with security policies is maintained. In some examples, such security management systems include (1) tools that manage user identities, authentication, and authorization, ensuring that only authorized users can access sensitive data, (2) security information and event management (SIEM) software that collects, analyzes, and correlates security event data from various sources to detect and respond to security incidents, (3) data encryption and decryption tools that encrypt data at rest and in transit, ensuring that sensitive information is protected from unauthorized access, and (4) software that tracks and logs access attempts, policy changes, and security events, providing an audit trail for compliance and monitoring purposes. In summary, a security management system is a comprehensive framework that manages, enforces, and monitors data security and privacy policies across an organization's data resources.

A set of diverse database tables refers to a collection of database tables that reside in different databases and contain various types of data. These tables are considered diverse because they serve different purposes, belong to different departments, store different kinds of information, are stored in different types of databases, structure data in different ways, or differ in a variety of other ways. Despite their diversity, they are grouped together for the purpose of applying common access control policies. In some examples, at least two tables in a set of diverse database table are unrelated but for the common set of access control policies. Unrelated tables refer to database tables that do not have a direct relationship in terms of their content, purpose, or structure. These tables may reside in different databases, belong to different departments, or store different types of data. Despite their lack of direct connection, they can be grouped together for the purpose of applying common access control policies.

In an example of the different types and structures of data stored in diverse tables, one table might store structured data, such as customer records with defined columns and data types, while another table might store unstructured data, such as text logs or JSON documents. In an example where diverse databases are tables stored in different databases, one table might be stored in a relational database like MySQL, while another might be in a NoSQL database like MongoDB. In an example where diverse database tables serve different purposes within an organization, one table might be used for transactional data, such as sales orders, while another table might be used for analytical data, such as aggregated sales reports. In an example where diverse database tables belong to different departments or business units within an organization, one table might be managed by the finance department, while another is managed by the marketing department.

In summary, diverse database tables are a collection of tables that differ in one or more characteristic, including data sources, data types, purposes, departmental ownership, etc.

Despite these differences, they can be grouped together for the purpose of applying common access control policies, simplifying the management of permissions and enhancing data security and privacy.

In some examples, associating each table with a common set of access control policies generally involves linking each table in the set to a predefined set of access control policies. Linking tables to policies includes several detailed steps to ensure that the tables adhere to the predefined rules and permissions. In some embodiments, the first step is to identify the table that needs to be associated with the common set of access control policies. The table is selected based on its relevance to the access control requirements. The table's metadata is updated to include references to the common access control policies. This metadata is stored in a centralized database, such as a DynamoDB table, which is managed by the security management system.

In some examples, a common set of access control policies generally refers to a standardized group of rules and permissions that are applied uniformly to two or more database tables. These policies govern who can access the data within these tables and what actions they can perform. The term "common" indicates that the same set of policies is consistently applied across all the tables to which it is associated, ensuring uniform access control and simplifying the management of permissions.

In summary, the consolidation performed in step 110 groups tables together for the purpose of applying common access control policies. This consolidation simplifies the management of permissions and ensures consistent application of access rules across all tables, regardless of their content or purpose.

At step 120, the systems described herein enforce the set of common access control policies to control access to each table in the set of database tables. Enforcing access control policies can be performed in a variety of ways and for numerous purposes, including access validation. In some examples, when a user or group attempts to access a table, a security management system validates the access request against the common access control policies. This validation checks whether the user or group has the necessary permissions (e.g., read, write, admin) to perform the requested action on the table. The security management system enforces the common access control policies by allowing or denying access based on the validation results. If the user or group has the required permissions, access is granted; otherwise, access is denied.

Policy enforcement generally refers to the mechanisms used to ensure that access control policies are applied consistently and accurately. This includes automated systems that monitor access attempts, validate permissions, and log access events. As discussed in greater detail below, enforcement mechanisms help prevent unauthorized access and ensure compliance with security policies, and enforcement may be performed in the context of regular auditing and monitoring of access control policies.

In some examples, as part of the enforcement step, all access attempts and actions performed on the tables are logged by the security management system. This logging provides an audit trail that can be used for monitoring and compliance purposes. The logs include details such as the user or group making the request, the type of access requested, and the outcome of the request (e.g., granted or denied). In some examples, enforcing access control policies also includes continuously monitoring access to the tables to ensure that the common access control policies are consistently enforced. This monitoring helps detect any unauthorized access attempts or policy violations in real-time. In some examples, if any discrepancies or unauthorized access attempts are detected, the security management system automatically adjusts the access control policies to remedy the issue. In some embodiments, this involves revoking unauthorized access, restoring removed permissions, updating the policies to address new security requirements, or locking access to data.

As an example of security policy enforcement, a company has defined a common set of access control policies for its customer-related tables, granting read and write permissions to the "Customer Support" group. When a support agent attempts to access a customer record, the security management system validates the request against the common policies. If the agent has the required permissions, access is granted, and the action is logged. If the agent does not have the necessary permissions, access is denied and the attempt is logged for further review.

As another example, an organization has implemented common access control policies for its financial data, granting read-only access to the "Finance Team" group. When a finance team member attempts to view a financial report, the security management system checks the request against the common policies. If the member has read-only access, the request is approved, and the action is logged. If the member attempts to modify the report, the request is denied, and the attempt is logged as a policy violation.

As a third example, a research institution has created common access control policies for its experimental data, granting read and write permissions to the "Research Scientists" group. When a scientist attempts to update an experimental dataset, the security management system validates the request against the common policies. If the scientist has the required permissions, the update is allowed, and the action is logged. If the scientist does not have the necessary permissions, the update is blocked, and the attempt is logged for further investigation.

As a fourth example of security policy enforcement, a content streaming platform has defined a common set of access control policies for its advertising-related tables, which include customer viewing history, ad interaction data, and demographic information. These policies grant read and write permissions to the "Advertising Team" group and admin permissions to the "Data Administrators" group. When a member of the Advertising Team attempts to access ad interaction data, the security management system validates the request against the common policies. If the team member has the required permissions, access is granted, and the action is logged. If the team member does not have the necessary permissions, access is denied, and the attempt is logged for further review. Additionally, if a data administrator attempts to modify the access control policies, the system checks the request against the admin permissions. If the administrator has the necessary permissions, the modification is allowed and logged. If not, the modification is blocked, and the attempt is logged as a policy violation. This ensures that sensitive information used in advertising is protected, access is controlled, and compliance with security policies is maintained.

As shown in these examples, enforcing security policies involves several sub-steps to ensure that access control rules are consistently applied and maintained across all relevant data resources. These sub-steps are typically managed by a security management system and include access validation, policy enforcement, logging, continuous monitoring, and automated adjustments.

In some examples, when policy enforcement involves access validation, the sub-steps include receiving requests, checking permissions, decision making, and implementation. For example, when a user or group attempts to access a table, the security management system receives the access request. This request includes details such as the user or group's identity, the table being accessed, and the type of action being requested (e.g., read, write, admin). The system then validates the access request against the common access control policies. It checks whether the user or group has the necessary permissions (read, write, admin) to perform the requested action on the table. Based on the validation, the system decides whether to grant or deny the access request. If the user or group has the required permissions, the request is approved; otherwise, it is denied.

Overall, the process of enforcing security policies shown in step 120 involves one or more of a comprehensive set of sub-steps that ensure consistent and secure management of data access. These sub-steps enhance data security, simplify permission management, and ensure compliance with organizational and regulatory requirements.

At step 130, the systems described herein provide, by a computing device of a security management system and without administrator input, automated management of the set of common access control policies. Step 130 may be performed in any suitable manner.

In some embodiments, the automated management of the set of common access control policies involves performs auditing, discrepancy detection, and remediation without requiring any manual intervention from administrators. In such embodiments, auditing the set of common access control policies involves a systematic review and verification process to ensure that the access control policies are correctly and consistently applied to all relevant data resources. This step is important for maintaining data security, compliance, and integrity. The following is a detailed description of FIG. 2, which shows example steps of a method 200 involved in auditing the set of common access control policies.

First, at step 210, the security management system schedules regular audits of the access control policies. The frequency of these audits can be configured based on organizational requirements, such as daily, weekly, or monthly intervals. Scheduled audits ensure that the access control policies are regularly reviewed and kept up-to-date. During the audit, the system retrieves the current access control lists (ACLs) for each table in the set of diverse database tables. The ACLs contain information about the permissions granted to users and groups, specifying who can access the data and what actions they can perform.

Next, at step 220, the system compares the current state of the ACLs with a baseline or reference state. The baseline represents the correct and intended configuration of the access control policies. Any deviations from this baseline are flagged as potential discrepancies. The baseline is typically defined based on organizational security policies and compliance requirements but can also include other references. The system checks the configuration of the access control policies to ensure they have not been altered in an unauthorized manner. This includes verifying that the policies still grant the correct permissions to the intended users and groups and that no unauthorized changes have been made. The system ensures that the policies align with the predefined rules and conditions.

As part of the audit, the system analyzes access logs to identify any unauthorized access attempts or actions that do not comply with the access control policies. This includes reviewing logs for actions such as reading, writing, or administering data that were performed without the necessary permissions. The analysis helps detect any potential security breaches or policy violations.

The system employs anomaly detection techniques to identify unusual patterns or behaviors that may indicate a security issue. This can include detecting access attempts from unexpected locations, at unusual times, or by users who do not typically access certain data resources. Anomaly detection helps identify potential threats and unauthorized activities.

In addition to scheduled audits, the system continuously monitors access attempts and actions in real-time. This allows for the immediate detection of any unauthorized access or policy violations as they occur. Real-time monitoring helps to quickly identify and respond to potential security threats.

The system generates detailed audit reports that provide an overview of the access control status, detected issues, and actions taken to resolve them. The reports include information about the users and groups with access, the permissions granted, and any discrepancies identified during the audit. The reports are used for compliance, monitoring, and decision-making purposes.

All audit activities, including the retrieval of ACLs, baseline comparisons, policy configuration checks, access logs analysis, and anomaly detection, are logged by the system. The logs provide an audit trail that can be used for monitoring and compliance purposes. The audit trail helps track the auditing process and ensures accountability.

At step 230, the systems described herein remedy a discrepancy discovered during an audit. Remedying a discrepancy discovered during an audit involves taking corrective actions to address deviations or inconsistencies in the application of access control policies. The goal is to ensure that the access control policies are correctly and consistently enforced, thereby maintaining data security, integrity, and compliance with organizational and regulatory requirements.

In some embodiments, remedying a discrepancy involves analyzing a discrepancy, determining corrective actions, and implementing the corrective actions. The system analyzes the nature and extent of the discrepancy to understand its impact on data security and compliance. This analysis may involve reviewing access logs, policy configurations, and any related metadata to determine the root cause of the issue. Based on the analysis, the system determines the appropriate corrective actions to address the discrepancy. These actions are designed to restore the correct access control settings and prevent similar issues from occurring in the future. The system automatically implements the corrective actions to remedy the discrepancy. In some examples, if the discrepancy involves unauthorized access, the system revokes the permissions granted to the unauthorized user or group. This ensures that only authorized users have access to the data. Additionally or alternatively, if the discrepancy involves missing permissions, the system restores the necessary permissions to the intended users or groups. This ensures that authorized users can perform their required actions on the data. As another example, if the discrepancy involves unauthorized changes to the access control policies, the system updates the policies to reflect the correct settings. This may include reverting to a previous version of the policies or making specific adjustments to align with the predefined rules and conditions.

In some cases, the system implements additional security measures to prevent similar discrepancies in the future. This includes tightening access controls, adding new conditions, and/or enhancing monitoring and auditing processes. Furthermore, in certain embodiments, some or all actions taken to remedy the discrepancy are logged by the system. This includes details about the nature of the discrepancy, the corrective actions implemented, and the outcome of those actions. The system generates a detailed report that provides an overview of the discrepancy, the actions taken to resolve it, and any recommendations for preventing similar issues in the future. Finally, after implementing the corrective actions, the system continues to monitor access attempts and policy configurations to ensure that the discrepancy has been fully resolved and that no new issues arise.

When detecting the discrepancy involves determining that the set of access control policies allow unauthorized access to the set of diverse database tables, remedying the discrepancy by modifying the set of common access control policies includes removing the unauthorized access. In this example, the security management system identifies a discrepancy during the audit process, specifically determining that the set of access control policies allows unauthorized access to the set of diverse database tables. This involves analyzing access logs, comparing current access control lists (ACLs) with a baseline, and employing anomaly detection techniques to identify any unauthorized access attempts or actions that do not comply with the predefined policies. Upon detecting the unauthorized access, the security management system automatically takes corrective actions to address the issue. This involves modifying the set of common access control policies to remove the unauthorized access. The system may revoke permissions granted to unauthorized users or groups, restore the correct access control settings, and update the policies to prevent future unauthorized access.

When detecting the discrepancy involves determining that the access control has been in the set of access control policies has been removed or modified, remedying the discrepancy involves modifying the set of common access control policies comprises restoring the access control. In this example, the security management system identifies a discrepancy during the audit process, specifically determining that the access control in the set of common access control policies has been removed or modified. This involves analyzing access logs, comparing current access control lists (ACLs) with a baseline, and employing anomaly detection techniques to identify any unauthorized changes to the access control settings. Upon detecting that the access control has been removed or modified, the security management system automatically takes corrective actions to address the issue. This involves modifying the set of common access control policies to restore the original access control settings. The system may reinstate permissions that were removed, correct any unauthorized modifications, and update the policies to ensure they align with the predefined rules and conditions.

Overall, remedying a discrepancy discovered during an audit involves a systematic process of identifying, analyzing, and addressing deviations in access control policies. The goal is to restore the correct settings, maintain data security, and ensure compliance with organizational and regulatory requirements.

As a first example of the method shown in FIG. 2, a company uses a security management system to manage access to its customer-related tables. The system schedules weekly audits to review the access control policies. During the audit, the system retrieves the ACLs, compares them with the baseline, checks the policy configurations, analyzes access logs, and detects any anomalies. The system generates an audit report detailing the findings and logs all audit activities.

As a second example, an organization implements a security management system to protect its financial data. The system schedules daily audits to ensure compliance with regulatory requirements. During the audit, the system retrieves the ACLs, compares them with the baseline, checks the policy configurations, analyzes access logs, and detects any anomalies. The system generates an audit report detailing the findings and logs all audit activities.

As a third example, a research institution uses a security management system to manage access to its experimental data. The system schedules monthly audits to review the access control policies. During the audit, the system retrieves the ACLs, compares them with the baseline, checks the policy configurations, analyzes access logs, and detects any anomalies. The system generates an audit report detailing the findings and logs all audit activities.

As a fourth example, a content streaming platform uses a security management system to manage access to sensitive information used in advertising. The system schedules bi-weekly audits to review the access control policies for tables containing customer viewing history, ad interaction data, and demographic information. During the audit, the system retrieves the ACLs for these tables, compares them with the baseline to ensure they align with the predefined policies, checks the policy configurations to verify that no unauthorized changes have been made, and analyzes access logs to identify any unauthorized access attempts or actions that do not comply with the access control policies. The system also employs anomaly detection techniques to identify unusual patterns or behaviors, such as access attempts from unexpected locations or at unusual times. The system generates a detailed audit report that provides an overview of the access control status, detected issues, and actions taken to resolve them. All audit activities are logged, providing an audit trail for monitoring and compliance purposes. This ensures that sensitive information used in advertising is protected, access is controlled, and compliance with security policies is maintained.

In some examples, the systems described herein may focus on the automated management of access control policies by incorporating the management of encryption keys used to secure data stored in the set of diverse database tables. In some examples, a security management system is responsible for managing access to encryption keys that are used to encrypt and decrypt data stored in the diverse database tables. This involves generating, storing, distributing, and rotating encryption keys to ensure data security and compliance with organizational policies and regulatory requirements. In such examples, the system automatically enforces access control policies to regulate who can access the encryption keys. This includes defining permissions for users and groups, specifying who can generate, retrieve, or use the keys for encryption and decryption operations. The system ensures that only authorized users and groups have access to the encryption keys.

The encryption keys are securely stored in a centralized key management system (KMS) or hardware security module (HSM). The security management system ensures that the keys are protected from unauthorized access and tampering. The keys are stored in an encrypted format, and access to the keys is logged for auditing purposes.

When a user or application needs to encrypt or decrypt data, the security management system securely distributes the appropriate encryption key. The system validates the access request against the common access control policies to ensure that the user or application has the necessary permissions to use the key. The key is then provided for the encryption or decryption operation.

In some examples, the security management system periodically rotates encryption keys to enhance security. This involves generating new keys and updating the access control policies to reflect the changes. The system also revokes access to old keys and ensures that data encrypted with old keys is re-encrypted with new keys. Key rotation helps mitigate the risk of key compromise and ensures the continued security of the data. Furthermore, all actions related to encryption key management, including key generation, retrieval, usage, rotation, and revocation, are automatically logged by the security management system. These logs provide an audit trail that can be used for monitoring and compliance purposes. The system generates reports that detail key management activities and any detected issues.

As an example of encryption key management, a company uses a security management system to manage access to encryption keys for its customer-related tables. The system defines access control policies that grant key access permissions to the "Data Security Team" group. When a support agent needs to decrypt customer data, the system validates the request, retrieves the appropriate key, and logs the key usage. The system also periodically rotates the keys and updates the access control policies accordingly.

As another example, an organization implements a security management system to manage encryption keys for its financial data. The system securely stores the keys in a hardware security module (HSM) and enforces access control policies that restrict key access to authorized users. When a finance team member needs to encrypt a financial report, the system validates the request, provides the key, and logs the key usage. The system also performs regular key rotation and generates audit reports for compliance purposes.

As a third example, a research institution uses a security management system to manage encryption keys for its experimental data. The system defines access control policies that grant key access permissions to the "Research Scientists" group. When a scientist needs to decrypt experimental data, the system validates the request, retrieves the key, and logs the key usage. The system also periodically rotates the keys and ensures that all data is re-encrypted with the new keys.

As a fourth example, a content streaming platform uses a security management system to manage encryption keys for sensitive information used in targeted advertising. The system defines access control policies that grant key access permissions to the "Advertising Security Team" group. When a marketing analyst needs to decrypt customer viewing history or ad interaction data for targeted advertising analysis, the system validates the request, retrieves the appropriate key, and logs the key usage. The system securely stores the keys in a hardware security module (HSM) to protect them from unauthorized access. Additionally, the system periodically rotates the encryption keys to enhance security, ensuring that data encrypted with old keys is re-encrypted with new keys. The system updates the access control policies to reflect the changes in key management and generates audit reports detailing key usage, rotations, and any detected issues for compliance purposes. This ensures that sensitive advertising data is protected through encryption, access to encryption keys is tightly controlled, and key management activities are logged for auditing and compliance purposes.

Overall, examples that incorporate the management of encryption keys used to secure data stored in diverse database tables ensure that data is protected through encryption, access to encryption keys is tightly controlled, and key management activities are automated and logged for auditing and compliance purposes.

In some examples, providing automated management of the set of common access-control policies involves aggregating contextual information about the set of diverse database tables. In such examples, the security management system collects and aggregates various types of contextual information about the diverse database tables. This information provides insights into how the tables are used, their importance, and their relationships with other data resources. Aggregating this information helps in making informed decisions about access control policies and data management.

The contextual information aggregated by the security management system may include, but is not limited to access frequency information, data lineage information, and criticality ranking information. Access frequency information is Information about how often each table is accessed. This includes the number of read and write operations performed on the table over a specific period. Data lineage information is information about the origin, movement, and transformation of data within the tables. Data lineage helps track how data flows through the system and how it is used in various processes. Criticality information is information about the importance or criticality of each table. This ranking is based on factors such as the sensitivity of the data, its role in business operations, and its impact on compliance and security.

In some examples, the security management system collects contextual information from various sources, including access logs, metadata repositories, and data processing workflows. This information is continuously updated to reflect the current state of the database tables. The system analyzes the aggregated contextual information to identify patterns, trends, and anomalies. This analysis helps in understanding how the tables are used, their relationships with other data resources, and their overall significance within the organization.

In certain scenarios, the aggregated and analyzed contextual information is used to inform and optimize access control policies. For example, tables that are frequently accessed may require more stringent access controls to prevent unauthorized access and ensure data security. As another example, understanding data lineage helps in defining access control policies that account for data dependencies and transformations, ensuring that data integrity is maintained. As a third example, tables with higher criticality rankings may require more restrictive access controls and additional monitoring to protect sensitive data and ensure compliance with regulatory requirements.

The security management system automatically adjusts access control policies based on the aggregated contextual information. This ensures that the policies remain relevant and effective in protecting the data resources. For example, if a table's access frequency increases significantly, the system may tighten access controls to mitigate potential security risks.

As a first example, a company uses a security management system to manage access to its customer-related tables. The system aggregates contextual information such as access frequency, data lineage, and criticality ranking. Based on this information, the system identifies that a customer profile table is frequently accessed and contains highly-sensitive data. The system automatically adjusts the access control policies to implement more stringent access controls and additional monitoring for this table.

As a second example, an organization implements a security management system to protect its financial data. The system aggregates contextual information about the financial tables, including access frequency and data lineage. The analysis reveals that certain financial reports are accessed by multiple departments and are important for compliance reporting. The system adjusts the access control policies to ensure that only authorized users from specific departments can access these reports, and it enhances monitoring to detect any unauthorized access attempts.

As a third example, a research institution uses a security management system to manage access to its experimental data. The system aggregates contextual information such as data lineage and criticality ranking. The analysis shows that certain experimental datasets are used in multiple research projects and are important for ongoing studies. The system adjusts the access control policies to ensure that only authorized researchers can access these datasets, and it implements additional safeguards to protect the data's integrity and confidentiality.

As a fourth example, a content streaming platform uses a security management system to manage access to sensitive data used for providing targeted ads to customers. The system aggregates contextual information such as access frequency, data lineage, and criticality ranking. Based on this information, the system identifies that tables containing customer viewing history and ad interaction data are frequently accessed by the marketing team and contain highly-sensitive information. The analysis reveals that these tables are important for targeted advertising campaigns and compliance with privacy regulations. The system automatically adjusts the access control policies to implement more stringent access controls and additional monitoring for these tables. For instance, the system may restrict access to specific IP addresses, enforce time-based access restrictions, and increase logging and auditing of access attempts. By aggregating and analyzing contextual information, the security management system ensures that only authorized users can access and modify sensitive advertising data, enhancing data security, privacy, and compliance with regulatory requirements.

In general, the automated management of the methods shown in FIGS. 1 and 2 may be performed without user input. Any of the steps, processes, or sub-steps discussed herein may be performed via automation or automation management. Automation and automated management generally refer to the use of technology to perform tasks and processes with minimal or no human intervention. It involves the implementation of systems and software that can execute predefined instructions, monitor activities, and make decisions based on programmed logic, artificial intelligence, and/or or real-time data. Such automation increases efficiency, accuracy, and consistency while reducing the need for manual effort and the potential for human error. In the context of data security and access control, automation ensures that policies are consistently applied, monitored, and adjusted without requiring user or administrator input, thereby enhancing overall system reliability and compliance.

FIG. 3 illustrates an exemplary system 300 for automated management of access to database tables that are grouped by policy. The system includes a query engine 310, a set of diverse database tables 320, a security management system 330, and users and groups 340 who can access the set of tables grouped by policy tables. The query engine 310 is responsible for querying tables within the set of tables grouped by policy. It interacts with the set of tables grouped by policy to retrieve data based on the access permissions defined by the common access control policies. The query engine ensures that only authorized queries are executed on the tables within the set of tables.

In some examples, set of diverse database tables 320 represents the tables that are grouped by policy but that are not related in at least one other way. In this example, the Set of tables grouped by policy is named "ads" and includes tables tagged with the secure tag "ADS." The set of tables contains two tables: "ads_comedy" and "ads_drama," each with multiple rows of data. The set of diverse database tables 320 is grouped in a manner than facilitates using common access control policies to regulate access to these tables.

In some embodiments, the security management system 330 manages the set of diverse database tables 320. It provides functionality for adding tables to the set of tables and granting permissions to users or groups to query the set of tables. The security management system 330 ensures that the metadata for the set of tables is updated and that access control policies are consistently applied.

In some examples, the users and groups 340 represent the individuals and teams who have been granted access to sets of tables grouped by policy. These users and groups are defined by the common access control policies, which specify the actions they can perform on the data, such as reading, writing, or administering the tables.

The security management system 330 is used to add tables to the set of diverse database tables 320. In this example, the tables "ads_comedy" and "ads_drama" are added to the set of tables grouped by policy and tagged with the secure tag "ADS." The metadata for these tables is updated to include references to the common access control policies.

The security management system 330 is also used to grant permissions to users or groups to query the set of tables grouped by policy. The permissions are defined by the common access control policies, which specify the actions that users and groups can perform on the data. The security management system ensures that the permissions are consistently applied and that only authorized users can access the tables.

The query engine 310 interacts with the set of diverse database tables 320 to execute queries on the tables. The query engine validates the access requests against the common access control policies to ensure that only authorized queries are executed. The results of the queries are then returned to the users or groups who have been granted access.

Overall, FIG. 3 illustrates how a set of tables grouped by policy consolidates access control for diverse database tables, enables enforcement of common access control policies, and facilitates automated management of permissions. The system ensures that sensitive data is protected, access is controlled, and compliance with security policies is maintained.

Figure 4:
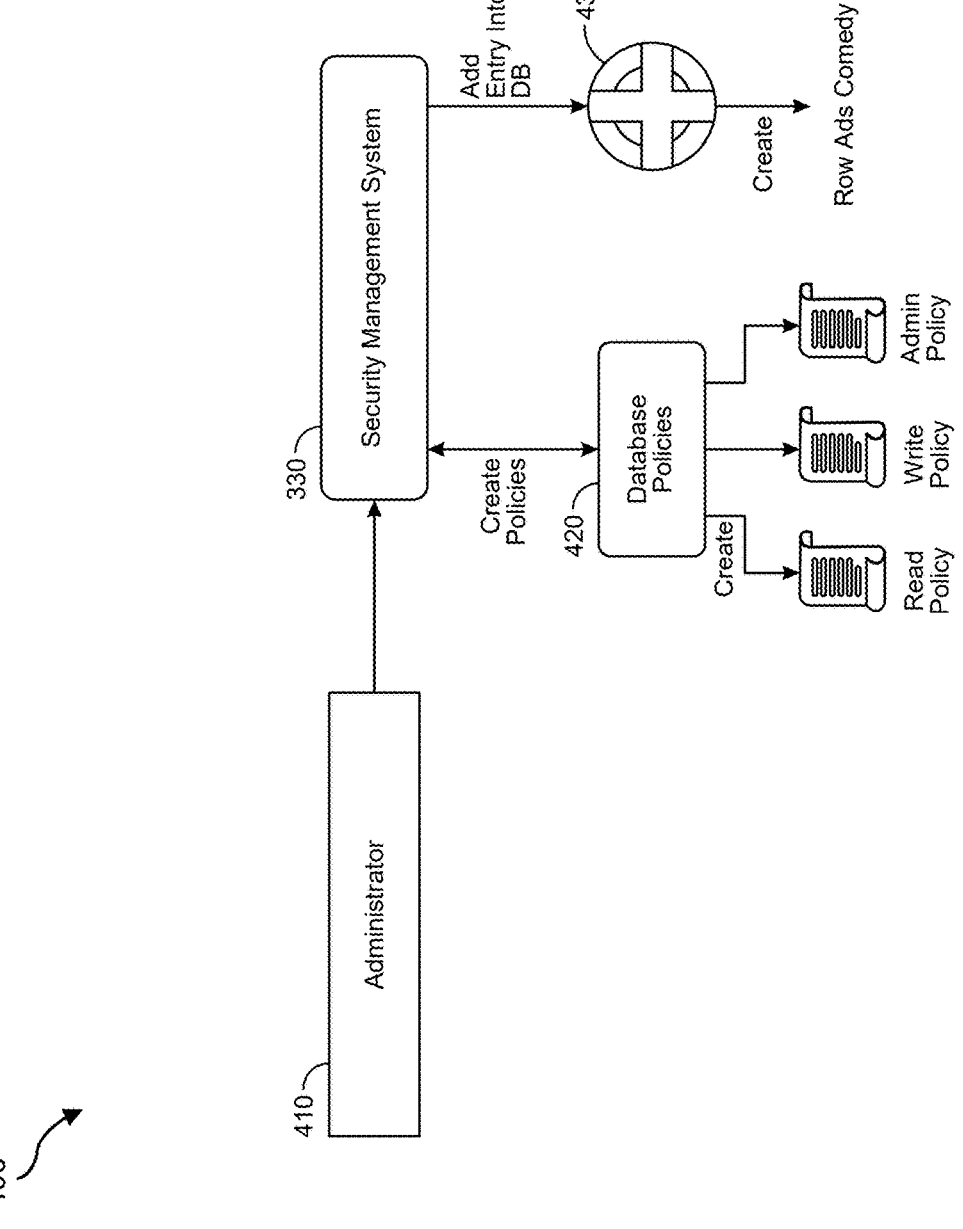
FIG. 4 illustrates an exemplary system for creating and managing access control policies for a set of tables grouped by access control policy.

FIG. 4 illustrates an exemplary system 400 for managing access to database tables using the security management system 330. An administrator 410 interacts with the system 400 via a request made to the security management system 330, which manages database policies 420 and a database 430. The figure shows the process of creating and managing access control policies for a set of tables grouped by policy.

In some examples, the administrator 410 is responsible for initiating requests to the set of tables grouped by policy. In other examples, the responsibilities of the administrator are partially or fully automated. The administrator 410 interacts with the security management system 330 to create and manage access control policies 420. In addition to creating access control policies, the security management system 330 is responsible for updating metadata and access control, and it ensures that the access control policies are consistently applied and maintained.

In certain embodiments, the database policies 420 represent the common access control policies that are applied to the tables within a set of tables grouped by policy. These policies include read, write, and admin policies, which define the actions that users and groups can perform on the data. The security management system 330 creates these policies based on the administrator's requests, based on an automated process, or any combination of administrator input and automation.

The database 430 contains the tables that are grouped by policy. In this example, the set of tables grouped by policy is named "Ads" and the tables are tagged with the secure tag "ADS." The security management system 330 updates the metadata for these tables to include references to the common access control policies.

As noted, the administrator 410 can make a request to change or update sets of tables grouped via the security management system 330. Such requests may include creating a new set of tables grouped by policy, adding tables to a set of tables grouped by policy, or updating access control policies. In the example shown in FIG. 4, administrator 410 requests that a new row be added to an "Ads Comedy" table, and this row inherits the access control policies of the set of tables include the "Ads Comedy" table. In other examples, such requests to change or update tables are performed automatically, as discussed in greater detail below.

Overall, FIG. 4 illustrates the process of creating and managing access control policies for a set of tables grouped by policy. The system 400 ensures that sensitive data is protected, access is controlled, and compliance with security policies is maintained.

FIG. 5 illustrates an exemplary process 500 for adding a table to a set of tables grouped by policy using the system architectures described herein. In this example, the administrator 410 initiates the process by running a command to add a table to a set of tables grouped by policy, where the set of tables has an identifier (i.e., ID) of Ads. The data platform tool (DPT) 510 then interacts with the security management system 330, which verifies that the caller (administrator 410) has the necessary admin permissions to add the table. Once verified, the security management system 330 sends an update call to the metadata management system 520. The metadata management system 520 verifies that an authorized service issued the update call and then adds the ID "Ads" to the table's metadata. This step ensures that the table is now associated with the specified set of tables grouped by policy.

In various examples, a metadata management system, such as metadata management system 520, is used by the systems described herein in a variety of manners. Such a system is a federated metadata service that provides a unified interface for accessing and managing metadata across various data stores. It serves as a centralized service that enables different compute engines to access diverse datasets in a consistent manner. In some examples, a metadata management system is designed to address the challenges of data abstraction, interoperability, discovery, and management in a large-scale data environment.

A metadata management system introduces a common abstraction layer that allows datasets to be accessed interchangeably by different query engines. It supports the creation of new tables in destination data stores using canonical data types, facilitating data movement between different systems. A metadata management system stores additional metadata about datasets, including connection information, configuration details, metrics, and time-to-live (TTL) information. It distinguishes between logical metadata (e.g., table audit information, column default values) and physical metadata (e.g., metrics about the actual data stored in the table).

A metadata management system publishes schema metadata and business/user-defined metadata, enabling full-text search and discovery of information in the data warehouse. It supports auto-suggest and auto-complete features in SQL editors, enhancing the user experience in data exploration. Datasets are organized as catalogs, and tags are used to categorize data based on organizations and subject areas.

In some examples, a metadata management system captures metadata changes and data updates, publishing events for real-time notifications and reactions. It supports an event-driven architecture, allowing other systems to react to metadata or data changes accordingly (e.g., cleaning up data when a table is dropped).

Overall, FIG. 5 illustrates the process of adding a table to a set of tables grouped by policy and updating the table's metadata via a metadata management system to reflect its association with a set of tables grouped by policy. The system ensures that the table is securely added to the set of tables grouped by policy and that the access control policies are consistently applied.

FIG. 6 illustrates an exemplary system 600 for monitoring and rightsizing access to database tables grouped by policy. The system includes several key components: the security management system 330, the database 430, the database policies 420, and the database table 530. The figure outlines the process of monitoring access and rightsizing permissions to ensure compliance with predefined policies.

In FIG. 6, the security management system 330 manages a monitoring and rightsizing workflow, which is an automated process that continuously monitors access to the tables within a set of tables grouped by policy and adjusts permissions as needed. This workflow helps ensure that only authorized users have access to the data and that access permissions are right-sized based on actual usage.

In some embodiments, the security management system 330 continuously monitors access to the tables within the set of tables grouped by policy. This monitoring involves tracking access attempts, actions performed, and any changes to the access control policies. The monitoring and rightsizing workflow detects any discrepancies or deviations from the common access control policies. This includes identifying unauthorized access, missing permissions, or changes to the access control settings that do not comply with the policies. The monitoring and rightsizing workflow automatically adjusts permissions based on actual usage. If a user or group has not accessed a table for a specified period, their permissions may be reduced or revoked. Conversely, if a user or group requires additional access based on their usage patterns, their permissions may be increased.

As shown in FIG. 6, the security management system 330 fetches metadata from a big data platform (BDP) shard to ensures that the metadata for the tables is up-to-date and accurately reflects the current access control policies. Security management system 330 also monitors table access control lists and modifies them if needed. This step involves tracking access attempts, actions performed, and any changes to the access control policies to ensure compliance with the predefined policies. The security management system 330 further monitors the database policies 420 and modifies members if needed.

Overall, FIG. 6 illustrates how the system 600 uses a monitoring and rightsizing workflow to ensure that access control policies are consistently enforced and that permissions are right-sized based on actual usage. The system ensures that sensitive data is protected, access is controlled, and compliance with security policies is maintained.

FIG. 7 illustrates an exemplary system 700 for managing and reconciling access control policies for database tables within a set of tables grouped by policy. The system includes several key components: the security management system 330, the database 430, the database policies 420, the set of diverse database tables 320, and metadata management system 520.

In this example, security management system 330 is responsible for periodically reconciling policies of each set of tables grouped by policy. This involves ensuring that the access control policies defined for the set of tables are consistently applied to all associated tables. The database 430 stores the metadata related to the set of tables. This metadata includes information about the secure tag, read policy ID, write policy ID, admin policy ID, and the tables within the set. The database policies 420 represent the common access control policies applied to the tables within the Set of tables grouped by policy. In one example, these policies include the following information:

Secure Tag: A tag indicating that the table is part of the Set of tables grouped by policy.

Read Policy ID: The identifier for the read access policy.

Write Policy ID: The identifier for the write access policy.

Admin Policy ID: The identifier for the admin access policy.

Tables: The list of tables associated with the Set of tables grouped by policy.

The security management system 330 periodically reconciles each set of tables by checking the metadata in the database 430 to verify that the policies are correctly associated with the tables. The metadata management system 520 makes an API call to add the policies to all tables that are part of the set of tables grouped by policy. This ensures that the tables are correctly tagged and associated with the appropriate access control policies. The table ACLs are updated to reflect the correct policies. This involves modifying the access control lists for each table in the set of diverse database tables 320 with the read, write, and admin policies defined for the set of tables.

Overall, FIG. 7 illustrates how a security management system ensures that a set of tables grouped by policy has access control policies consistently applied and maintained for all tables within the set. The system automates the process of reconciling policies and updating table ACLs, ensuring that sensitive data is protected and access is controlled in compliance with security policies.

By consolidating access control to a set of diverse database tables under a common set of access control policies, the systems described herein simplify the management of permissions and ensure consistent application of access rules across all tables, regardless of their content or purpose. This reduces the complexity and potential for errors associated with managing multiple, disparate access control systems, thereby enhancing data security and operational efficiency.

In summary of the discussion corresponding to FIGS. 1-7, providing automated management of the set of common access control policies without administrator input significantly reduces the manual effort required to maintain up-todate access controls. This automation includes auditing the policies, detecting discrepancies, and remedying them by modifying the policies as needed. This ensures that the access control settings are always accurate and compliant with organizational and regulatory requirements, thereby improving data security and compliance.

Figure 8:
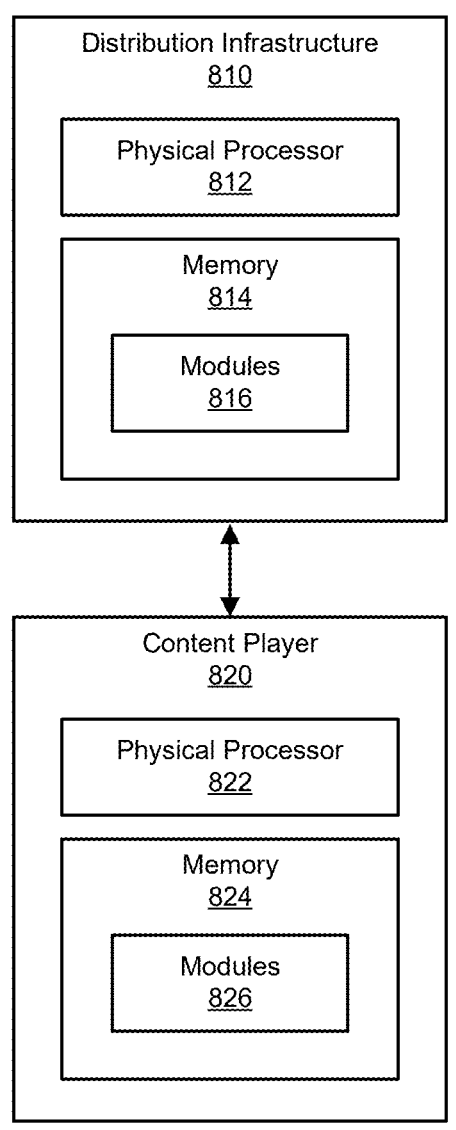
FIG. 8 is a block diagram of an exemplary content distribution ecosystem.

As noted above, FIGS. 8-10 show components of a content distribution ecosystem in which embodiments of this disclosure are implemented according to some examples. FIG. 8 is a block diagram of a content distribution ecosystem 800 that includes a distribution infrastructure 810 in communication with a content player 820. In some embodiments, distribution infrastructure 810 may be configured to encode data and to transfer the encoded data to content player 820 via data packets. Content player 820 may be configured to receive the encoded data via distribution infrastructure 810 and to decode the data for playback to a user. The data provided by distribution infrastructure 810 may include audio, video, text, images, animations, interactive content, haptic data, virtual or augmented reality data, location data, gaming data, or any other type of data that may be provided via streaming.

Distribution infrastructure 810 generally represents any services, hardware, software, or other infrastructure components configured to deliver content to end users. For example, distribution infrastructure 810 may include content aggregation systems, media transcoding and packaging services, network components (e.g., network adapters), and/or a variety of other types of hardware and software. Distribution infrastructure 810 may be implemented as a highly complex distribution system, a single media server or device, or anything in between. In some examples, regardless of size or complexity, distribution infrastructure 810 may include at least one physical processor 812 and at least one memory device 814. One or more modules 816 may be stored or loaded into memory 814 to enable adaptive streaming, as discussed herein.

Content player 820 generally represents any type or form of device or system capable of playing audio and/or video content that has been provided over distribution infrastructure 810. Examples of content player 820 include, without limitation, mobile phones, tablets, laptop computers, desktop computers, televisions, set-top boxes, digital media players, virtual reality headsets, augmented reality glasses, and/or any other type or form of device capable of rendering digital content. As with distribution infrastructure 810, content player 820 may include a physical processor 822, memory 824, and one or more modules 826. Some or all of the adaptive streaming processes described herein may be performed or enabled by modules 826, and in some examples, modules 816 of distribution infrastructure 810 may coordinate with modules 826 of content player 820 to provide adaptive streaming of multimedia content.

In certain embodiments, one or more of modules 816 and/or 826 in FIG. 8 may represent one or more software applications or programs that, when executed by a computing device, may cause the computing device to perform one or more tasks. For example, and as will be described in greater detail below, one or more of modules 816 and 826 may represent modules stored and configured to run on one or more general-purpose computing devices. One or more of modules 816 and 826 in FIG. 8 may also represent all or portions of one or more special-purpose computers configured to perform one or more tasks.

Physical processors 812 and 822 generally represent any type or form of hardware-implemented processing unit capable of interpreting and/or executing computer-readable instructions. In one example, physical processors 812 and 822 may access and/or modify one or more of modules 816 and 826, respectively. Additionally or alternatively, physical processors 812 and 822 may execute one or more of modules 816 and 826 to facilitate adaptive streaming of multimedia content. Examples of physical processors 812 and 822 include, without limitation, microprocessors, microcontrollers, central processing units (CPUs), field-programmable gate arrays (FPGAs) that implement softcore processors, application-specific integrated circuits (ASICs), portions of one or more of the same, variations or combinations of one or more of the same, and/or any other suitable physical processor.

Memory 814 and 824 generally represent any type or form of volatile or non-volatile storage device or medium capable of storing data and/or computer-readable instructions. In one example, memory 814 and/or 824 may store, load, and/or maintain one or more of modules 816 and 826. Examples of memory 814 and/or 824 include, without limitation, random access memory (RAM), read only memory (ROM), flash memory, hard disk drives (HDDs), solid-state drives (SSDs), optical disk drives, caches, variations or combinations of one or more of the same, and/or any other suitable memory device or system.

Figure 9:
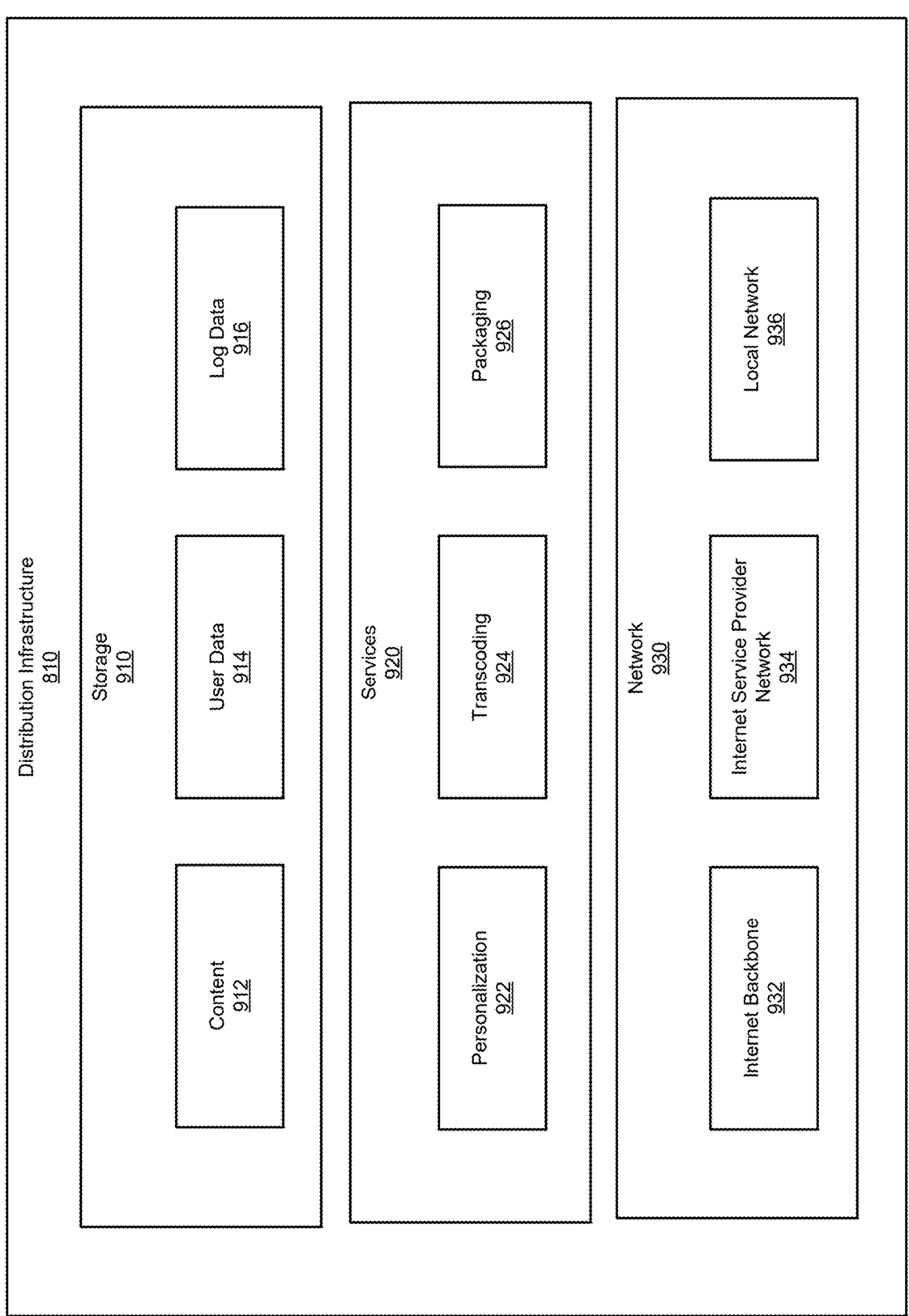
FIG. 9 is a block diagram of an exemplary distribution infrastructure within the content distribution ecosystem shown in FIG. 8.

FIG. 9 is a block diagram of exemplary components of content distribution infrastructure 810 according to certain embodiments. Distribution infrastructure 810 may include storage 910, services 920, and a network 930. Storage 910 generally represents any device, set of devices, and/or systems capable of storing content for delivery to end users. Storage 910 may include a central repository with devices capable of storing terabytes or petabytes of data and/or may include distributed storage systems (e.g., appliances that mirror or cache content at Internet interconnect locations to provide faster access to the mirrored content within certain regions). Storage 910 may also be configured in any other suitable manner.

As shown, storage 910 may store, among other items, content 912, user data 914, and/or log data 916. Content 912 may include television shows, movies, video games, user-generated content, and/or any other suitable type or form of content. User data 914 may include personally identifiable information (PII), payment information, preference settings, language and accessibility settings, and/or any other information associated with a particular user or content player. Log data 916 may include viewing history information, network throughput information, and/or any other metrics associated with a user's connection to or interactions with distribution infrastructure 810.

Services 920 may include personalization services 922, transcoding services 924, and/or packaging services 926. Personalization services 922 may personalize recommendations, content streams, and/or other aspects of a user's experience with distribution infrastructure 810. Encoding services, such as transcoding services 924, may compress media at different bitrates which may enable real-time switching between different encodings. Packaging services 926 may package encoded video before deploying it to a delivery network, such as network 930, for streaming.

Network 930 generally represents any medium or architecture capable of facilitating communication or data transfer. Network 930 may facilitate communication or data transfer via transport protocols using wireless and/or wired connections. Examples of network 930 include, without limitation, an intranet, a wide area network (WAN), a local area network (LAN), a personal area network (PAN), the Internet, power line communications (PLC), a cellular network (e.g., a global system for mobile communications (GSM) network), portions of one or more of the same, variations or combinations of one or more of the same, and/or any other suitable network. For example, as shown in FIG. 9, network 930 may include an Internet backbone 932, an internet service provider 934, and/or a local network 936.

Figure 10:
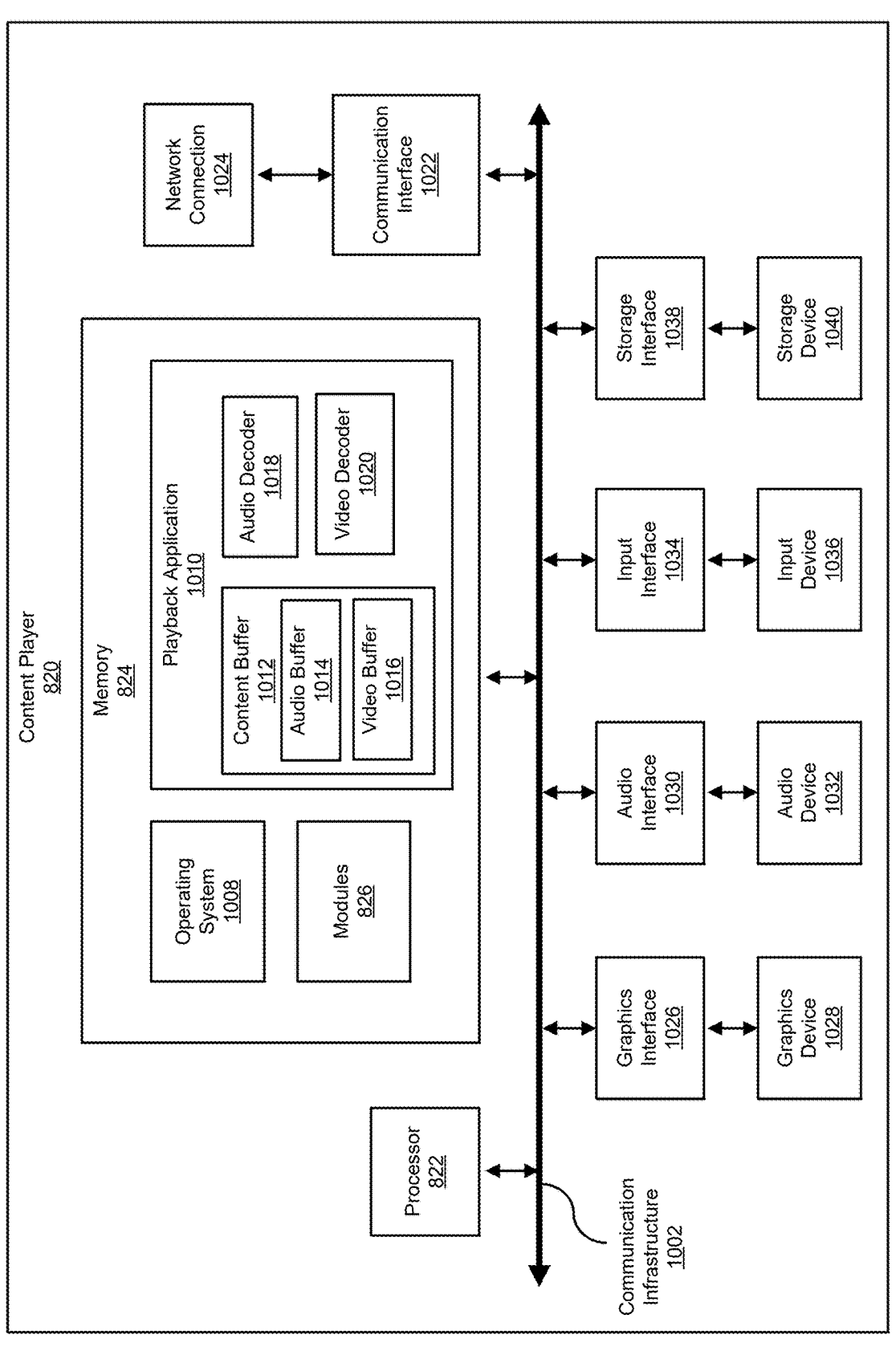
FIG. 10 is a block diagram of an exemplary content player within the content distribution ecosystem shown in FIG. 8.

FIG. 10 is a block diagram of an exemplary implementation of content player 820 of FIG. 8. Content player 820 generally represents any type or form of computing device capable of reading computer-executable instructions. Content player 820 may include, without limitation, laptops, tablets, desktops, servers, cellular phones, multimedia players, embedded systems, wearable devices (e.g., smart watches, smart glasses, etc.), smart vehicles, gaming consoles, internet-of-things (IoT) devices such as smart appliances, variations or combinations of one or more of the same, and/or any other suitable computing device.

As shown in FIG. 10, in addition to processor 822 and memory 824, content player 820 may include a communication infrastructure 1002 and a communication interface 1022 coupled to a network connection 1024. Content player 820 may also include a graphics interface 1026 coupled to a graphics device 1028, an audio interface 1030 coupled to an audio device 1032, an input interface 1034 coupled to an input device 1036, and a storage interface 1038 coupled to a storage device 1040.

Communication infrastructure 1002 generally represents any type or form of infrastructure capable of facilitating communication between one or more components of a computing device. Examples of communication infrastructure 1002 include, without limitation, any type or form of communication bus (e.g., a peripheral component interconnect (PCI) bus, PCI Express (PCIe) bus, a memory bus, a frontside bus, an integrated drive electronics (IDE) bus, a control or register bus, a host bus, etc.).

As noted, memory 824 generally represents any type or form of volatile or non-volatile storage device or medium capable of storing data and/or other computer-readable instructions. In some examples, memory 824 may store and/or load an operating system 1008 for execution by processor 822. In one example, operating system 1008 may include and/or represent software that manages computer hardware and software resources and/or provides common services to computer programs and/or applications on content player 820.

Operating system 1008 may perform various system management functions, such as managing hardware components (e.g., graphics interface 1026, audio interface 1030, input interface 1034, and/or storage interface 1038). Operating system 1008 may also process memory management models for playback application 1010. The modules of playback application 1010 may include, for example, a content buffer 1012, an audio decoder 1018, and a video decoder 1020.

Playback application 1010 may be configured to retrieve digital content via communication interface 1022 and play the digital content through graphics interface 1026. A video decoder 1020 may read units of video data from audio buffer 1014 and/or video buffer 1016 and may output the units of video data in a sequence of video frames corresponding in duration to the fixed span of playback time. Reading a unit of video data from video buffer 1016 may effectively dequeue the unit of video data from video buffer 1016. The sequence of video frames may then be rendered by graphics interface 1026 and transmitted to graphics device 1028 to be displayed to a user.

In situations where the bandwidth of distribution infrastructure 810 is limited and/or variable, playback application 1010 may download and buffer consecutive portions of video data and/or audio data from video encodings with different bit rates based on a variety of factors (e.g., scene complexity, audio complexity, network bandwidth, device capabilities, etc.). In some embodiments, video playback quality may be prioritized over audio playback quality. Audio playback and video playback quality may also be balanced with each other, and in some embodiments audio playback quality may be prioritized over video playback quality.

Content player 820 may also include a storage device 1040 coupled to communication infrastructure 1002 via a storage interface 1038. Storage device 1040 generally represent any type or form of storage device or medium capable of storing data and/or other computer-readable instructions. For example, storage device 1040 may be a magnetic disk drive, a solid-state drive, an optical disk drive, a flash drive, or the like. Storage interface 1038 generally represents any type or form of interface or device for transferring data between storage device 1040 and other components of content player 820.

Many other devices or subsystems may be included in or connected to content player 820. Conversely, one or more of the components and devices illustrated in FIG. 10 need not be present to practice the embodiments described and/or illustrated herein. The devices and subsystems referenced above may also be interconnected in different ways from that shown in FIG. 10. Content player 820 may also employ any number of software, firmware, and/or hardware configurations.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may transform data policies automatically by auditing and correcting such policies as needed.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory computer-readable media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:

consolidating, by a computing device of a security management system, access control to a set of diverse database tables by associating each table in the set of diverse database tables with a set of common access control policies, at least two of the tables in the set of diverse database tables being unrelated but for the set of common access control policies;

enforcing, by the computing device of the security management system, the set of common access control policies to control access to each table in the set of diverse database tables; and providing, by the computing device of the security management system and without administrator input, automated management of the set of common access control policies.

2. The computer-implemented method of claim 1, wherein providing the automated management of the set of common access control policies comprises performing, without administrator input:

auditing the set of common access control policies;

detecting a discrepancy during the audit of the set of common access control policies; and remedying the discrepancy by modifying the set of common access control policies.

3. The computer-implemented method of claim 2, wherein:

detecting the discrepancy comprises determining that the set of access control policies allow unauthorized access to the set of diverse database tables; and remedying the discrepancy by modifying the set of common access control policies comprises removing the unauthorized access.

4. The computer-implemented method of claim 2, wherein:

detecting the discrepancy comprises determining that at least one access control in the set of common access control policies has been removed or modified; and remedying the discrepancy by modifying the set of common access control policies comprises restoring the at least one access control that had been removed or modified.

5. The computer-implemented method of claim 1, wherein providing automated management of the set of common access control policies comprises managing access to a key used to encrypt data stored in the set of diverse database tables.

6. The computer-implemented method of claim 1, wherein providing automated management of the set of common access control policies comprises aggregating contextual information about the set of diverse database tables.

7. The computer-implemented method of claim 6, wherein the contextual information comprises at least one of access frequency, data lineage, and criticality ranking.

8. A system comprising:

at least one physical processor; and physical memory comprising computer-executable instructions that, when executed by the physical processor, cause the physical processor to:

consolidate, by a computing device of a security management system, access control to a set of diverse database tables by associating each table in the set of diverse database tables with a set of common access control policies, at least two of the tables in the set of diverse database tables being unrelated but for the set of common access policies;

enforce, by the computing device of the security management system, the set of common access control policies to control access to each table in the set of diverse database tables; and provide, by the computing device of the security management system and without administrator input, automated management of the set of common access control policies.

9. The system of claim 8, wherein the computer-executable instructions cause the physical processor to provide the automated management of the set of common access control policies by performing, without user input:

auditing the set of common access control policies;

detecting a discrepancy during the audit of the set of common access control policies; and remedying the discrepancy by modifying the set of common access control policies.

10. The system of claim 9, wherein:

detecting the discrepancy comprises determining that the set of common access control policies allow unauthorized access to the set of diverse database tables; and remedying the discrepancy by modifying the set of common access control policies comprises removing the unauthorized access.

11. The system of claim 9, wherein:

detecting the discrepancy comprises determining that at least one access control in the set of common access control policies has been removed or modified; and remedying the discrepancy by modifying the set of common access control policies comprises restoring the access control.

12. The system of claim 8, wherein the computer-executable instructions cause the physical processor to provide the automated management of the set of common access control policies by managing access to a key used to encrypt data stored in the set of diverse database tables.

13. The system of claim 8, wherein the computer-executable instructions cause the physical processor to provide the automated management of the set of common access control policies by aggregating contextual information about the set of diverse database tables.

14. The system of claim 13, wherein the contextual information comprises at least one of access frequency, data lineage, and criticality ranking.

15. A non-transitory computer-readable medium comprising one or more computer-executable instructions that, when executed by at least one processor of a computing device, cause the computing device to:

consolidate, by a computing device of a security management system, access control to a set of diverse database tables by associating each table in the set of diverse database tables with a set of common access control policies, at least two of the tables in the set of diverse database tables being unrelated but for the set of common access control policies;

enforce, by the computing device of the security management system, the set of common access control policies to control access to each table in the set of diverse database tables; and provide, by the computing device of the security management system and without administrator input, automated management of the set of common access control policies.

16. The non-transitory computer-readable medium of claim 15, wherein the computer-executable instructions cause the computing device to provide the automated management of the set of common access control policies by, without administrator input:

auditing the set of common access control policies;

detecting a discrepancy during the audit of the set of common access control policies; and remedying the discrepancy by modifying the set of common access control policies.

17. The non-transitory computer-readable medium of claim 16, wherein:

detecting the discrepancy comprises determining that the set of common access control policies allow unauthorized access to the set of diverse database tables; and remedying the discrepancy by modifying the set of common access control policies comprises removing the unauthorized access.

18. The non-transitory computer-readable medium of claim 16, wherein:

detecting the discrepancy comprises determining that at least one access control in the set of common access control policies has been removed or modified; and remedying the discrepancy by modifying the set of common access control policies comprises restoring the at least one access control that had been removed or modified.

19. The non-transitory computer-readable medium of claim 15, wherein the computer-executable instructions cause the computing device to provide the automated management of the set of common access control policies by managing access to a key used to encrypt data stored in the set of diverse database tables.

20. The non-transitory computer-readable medium of claim 15, wherein the computer-executable instructions cause the computing device to provide the automated management of the set of common access control policies by aggregating contextual information about the set of diverse database tables.

* * * * *